Aug. 1, 1944.   H. K. REHN   2,354,881
AUXILIARY BICYCLE SEAT
Filed Dec. 1, 1942   2 Sheets-Sheet 1
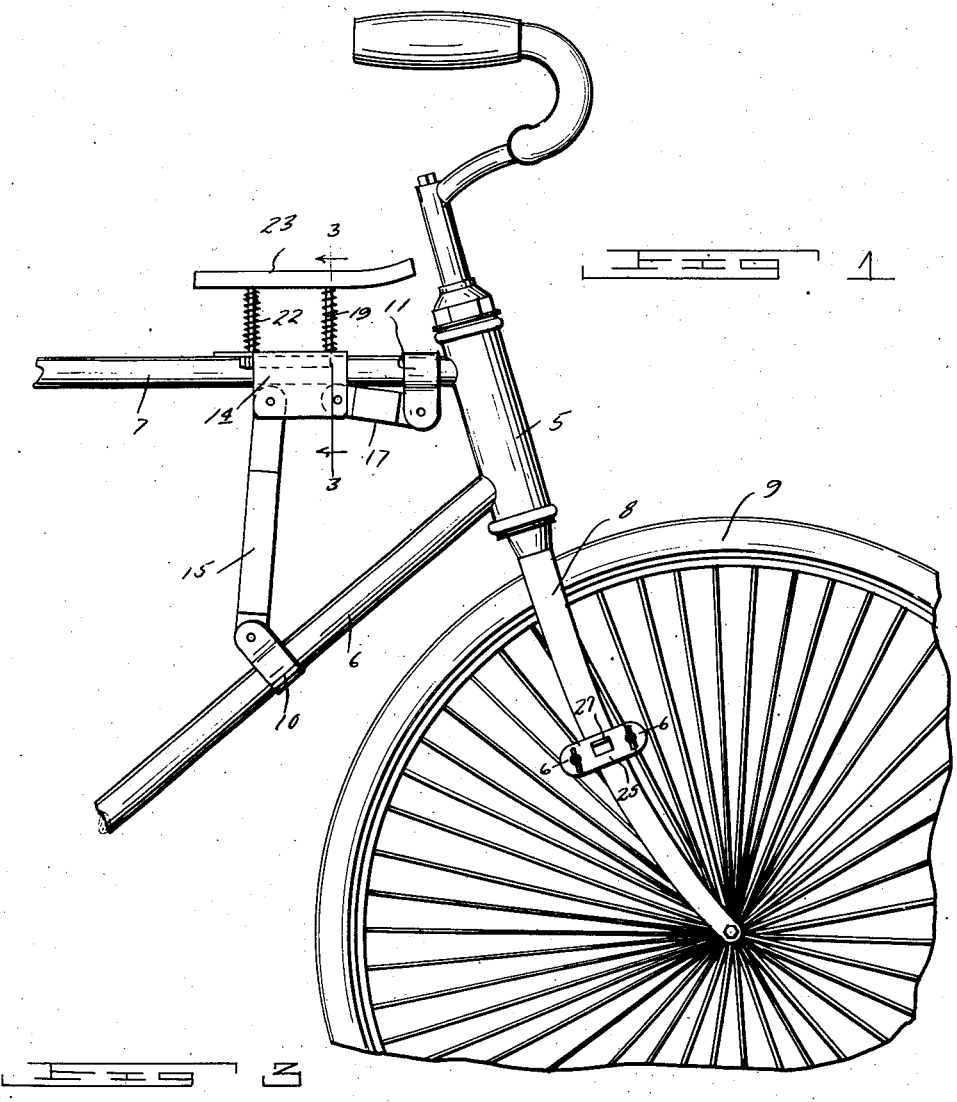
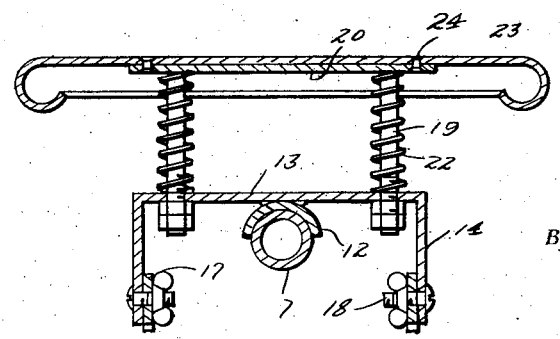
Inventor
Herman K. Rehn
By Clarence A. O'Brien
and Harvey B. Jacobson
Attorneys Aug. 1, 1944.  H. K. REHN  2,354,881
AUXILIARY BICYCLE SEAT
Filed Dec. 1, 1942  2 Sheets-Sheet 2
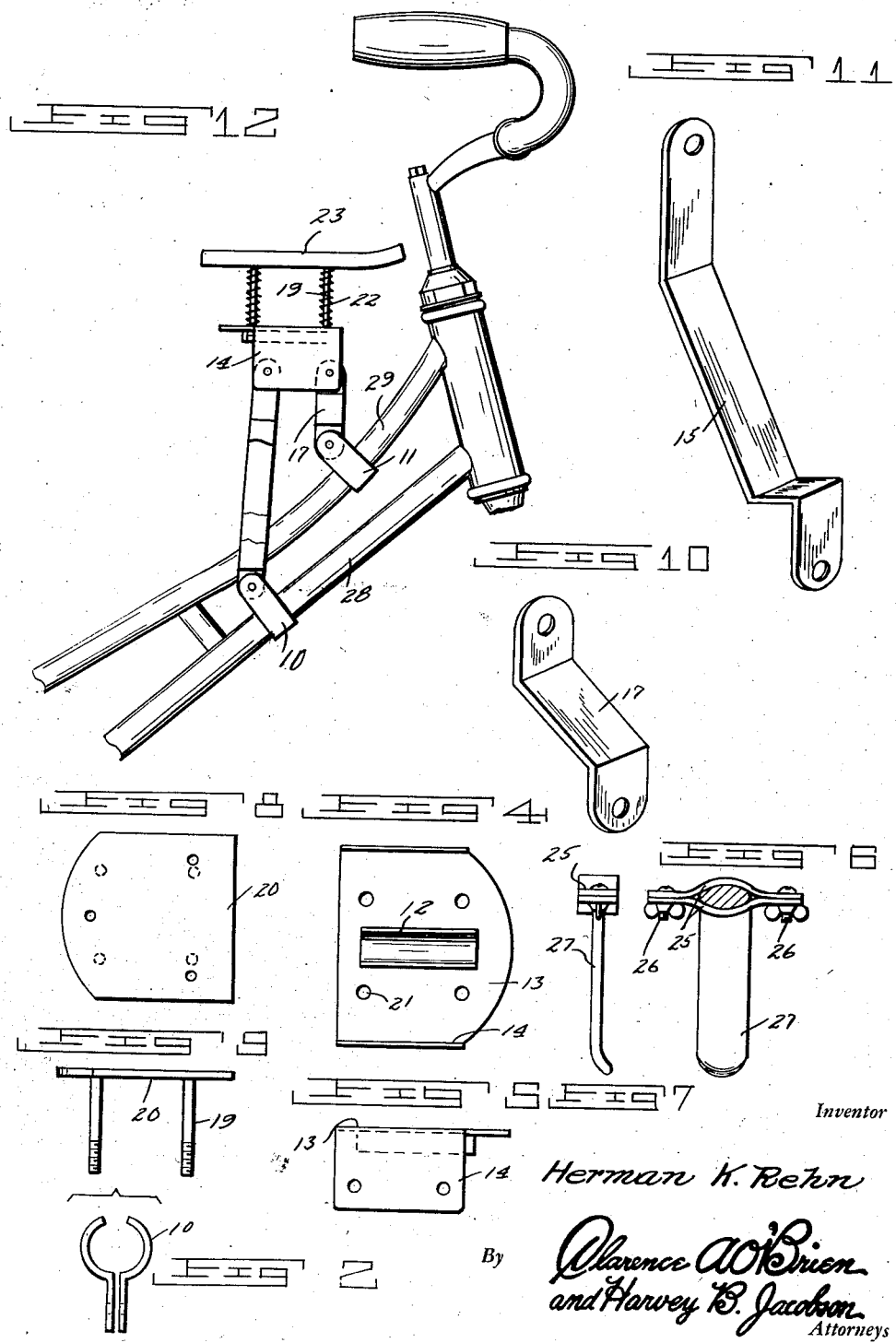

Patented Aug. 1, 1944

2,354,881

UNITED STATES PATENT OFFICE 2,354,881

AUXILIARY BICYCLE SEAT

Herman K. Rehn, Amherst, Mass.

Application December 1, 1942, Serial No. 467,508

2 Claims. (Cl. 155—5.13)

The present invention relates to new and useful improvements in auxiliary seats for bicycles designed primarily for use as a seat for a child adapted to be carried on the frame of the bicycle by the rider thereof.

An important object of the present invention is to provide an auxiliary seat attachment of this character which may be conveniently secured in position on the frame of either a man's or woman's bicycle and interchangeably used on either type of vehicle.

A further object is to provide an adjustable foot rest for use in conjunction with the auxiliary seat.

A still further object is to provide an attachment of this character of simple and practical construction, which is neat and attractive in appearance, relatively inexpensive to manufacture, which may be secured in position without any changes or alterations in the construction of the bicycle and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a fragmentary side elevational view of a bicycle showing the auxiliary seat in position thereon.

Figure 2 is an end elevational view of one of the clamp members.

Figure 3 is a vertical sectional view taken substantially on the line 3—3 of Figure 1.

Figure 4 is a bottom plan view of the base member of the auxiliary seat.

Figure 5 is a side elevational view thereof.

Figure 6 is a sectional view through the foot rest taken substantially on a line 6—6 of Figure 1.

Figure 7 is a side elevational view of the foot rest.

Figure 8 is a plan view of the upper attaching plate for the auxiliary seat.

Figure 9 is a side elevational view thereof.

Figure 10 is a perspective view of the front supporting leg for the auxiliary seat.

Figure 11 is a similar view of the rear supporting leg, and

Figure 12 is a fragmentary side elevational view of a woman's bicycle showing the auxiliary seat in position thereon.

Referring now to the drawings in detail and with particular reference to Figures 1 to 11, inclusive, the numeral 5 designates the frame of a bicycle generally which includes a lower inclined frame member 6 and an upper horizontal frame member or bar 7. The front fork of the bicycle is designated at 8 on the lower ends of which the front wheel 9 is journaled.

A sectional clamping member 10 is secured to the frame member 6 and a similar clamping member 11 is secured to the upper frame member 7.

A semi-cylindrical saddle member 12 is welded, soldered or otherwise secured to the underside of an inverted U-shaped base member 13, the saddle member 12 being adapted to rest on the upper frame member 7, with the legs or sides 14 of the base member extending downwardly at opposite sides thereof.

A pair of rear supporting legs 15 are secured at their lower ends to the clamp 10 and diverge at their upper ends for attaching to the opposite downwardly extending sides 14 of the base by bolt and wing nuts 16.

A pair of short leg members 17 connect the clamp member 11 to the front edges of the sides 14 by bolts and wing nuts 18.

Rising from the base member 13 are a plurality of posts 19 to the upper ends of which is secured a plate 20. The posts 19 are freely inserted through openings 21 in the base 13 and coil springs 22 yieldably support the plate 20. The seat 23 is riveted or otherwise suitably secured to the plate 20 as indicated at 24.

A pair of clamping plates 25—25 are secured to one of the forks 8 by bolts and wing nuts 26—26 and projecting laterally from one of the clamping plates 25 is a foot rest 27.

In the form of the invention illustrated in Figure 12 of the drawings, the auxiliary seat is shown attached to a woman's bicycle which includes a pair of inclined front frame members 28 and 29 to which the rear clamp 10 and the front clamp 11 are respectively attached in a desired position.

It is believed the details of construction, operation and manner of use of the device will be readily understood from the foregoing without further detailed explanation.

Having described the invention, what is claimed as new is:

1. An auxiliary bicycle saddle comprising a seat for disposition over an upper bar of a bicycle frame, posts extending downwardly from said seat and spaced from each other transversely thereof, a yoke under said seat for extending transversely across the said upper bar and provided with depending portions at its sides, a centering member of substantially inverted U-shape in cross section fixed to the under face of said yoke midway the width thereof with its side portions extending downwardly, said centering member extending longitudinally of the yoke for resting upon the said cross bar in straddling relation thereto, said posts slidably passing through said yoke between said centering member and the depending legs of the yoke, springs about said posts between the yoke and the seat for yieldably resisting downward movement of the seat, legs carried by the depending side portions of said yoke at front and rear ends thereof, and clamps for connecting ends of said legs with the upper cross bar and a lower cross bar of the bicycle frame.

2. An auxiliary bicycle saddle comprising a seat, posts extending downwardly from said seat and spaced from each other transversely thereof, a yoke under said seat provided with depending side portions and formed with openings slidably receiving said posts, spring means yieldably resisting downward movement of said seat, an elongated centering member carried by said yoke midway the width thereof and extending downwardly from the under face thereof for straddling a cross bar of a bicycle frame, front and rear legs, bolts securing said legs to lower ends of the side portions of said yoke and tightened to secure the legs in angularly adjusted positions, and means for detachably securing said legs to bars of a bicycle frame.

HERMAN K. REHN.